(12) United States Patent
Suzuki et al.

(10) Patent No.: US 6,362,452 B1
(45) Date of Patent: Mar. 26, 2002

(54) PATTERNED LASER ZONE TEXTURE

(75) Inventors: Shoji Suzuki, San Jose; Dan Frusescu, Santa Clara; David Vigdor Salamon, San Jose, all of CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/244,704

(22) Filed: Feb. 4, 1999

(51) Int. Cl.[7] .............................................. B23K 26/00
(52) U.S. Cl. .................................................. 219/121.69
(58) Field of Search ...................... 219/121.66, 121.69, 219/121.61, 121.71, 121.82

(56) References Cited

U.S. PATENT DOCUMENTS

| | | | | |
|---|---|---|---|---|
| 4,165,495 A | * | 8/1979 | Takahashi | 330/283 |
| 5,586,040 A | * | 12/1996 | Baumgart et al. | 364/474.08 |
| 5,973,894 A | * | 10/1999 | Ohsawa et al. | 360/135 |
| 5,981,902 A | | 11/1999 | Arita et al. | 219/121.68 |

FOREIGN PATENT DOCUMENTS

| | | |
|---|---|---|
| JP | 98-222234/20 | 6/1998 |
| WO | WO 98/12697 | 3/1998 |

OTHER PUBLICATIONS

Wei H. Yao, et al., "Head–Disc Dynamics of Low Resonance Laser Textures—A Spectrogram Analysis", IEEE Trans. Magn. vol. 34, No. 4, Jul. 1998, pp. 1699–1701.

* cited by examiner

*Primary Examiner*—Samuel M. Heinrich

(57) ABSTRACT

A method for texturing a substrate comprises rotating the substrate while applying laser pulses thereto. Of importance, the rotational velocity of the substrate is varied during texturing to change the spacing of the resulting laser bumps in accordance with a periodic function. This helps reduce or eliminate vibration in a read-write head after the substrate is formed into a magnetic disk, and the magnetic disk is in use.

20 Claims, 5 Drawing Sheets

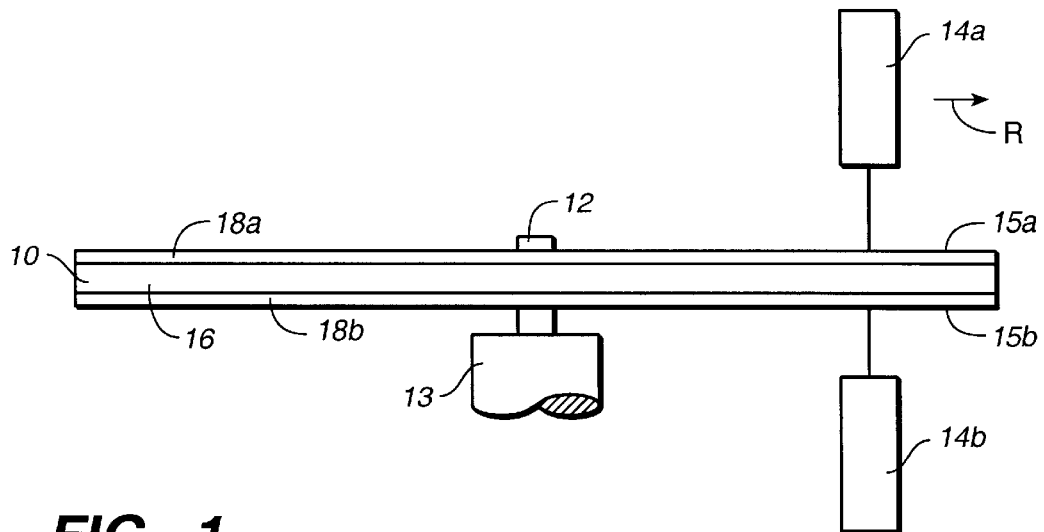
FIG._1
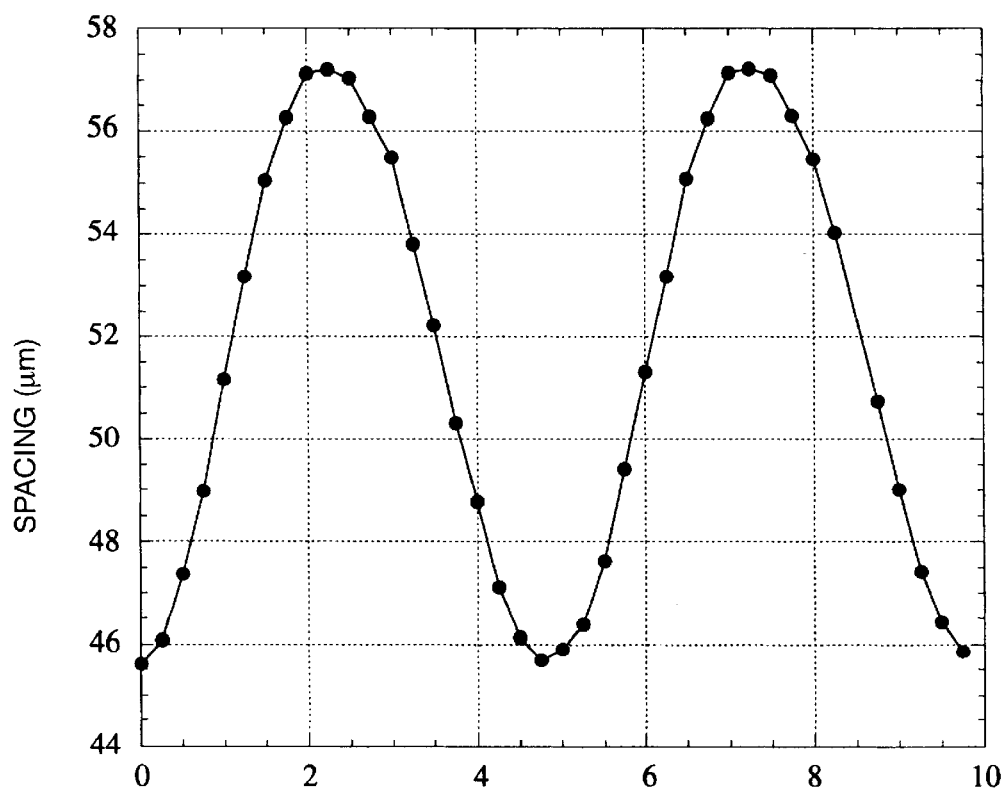
FIG._2 DISTANCE ALONG SPIRAL (REVOLUTIONS)

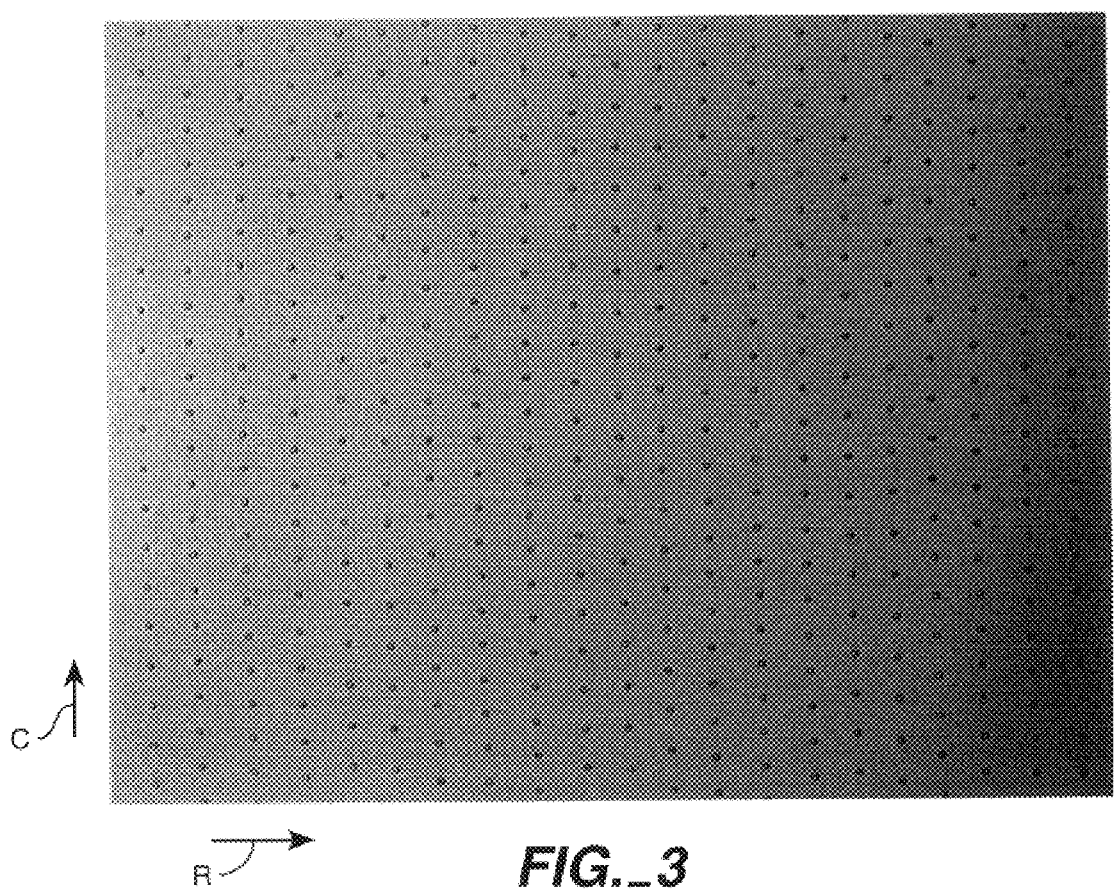
FIG._3

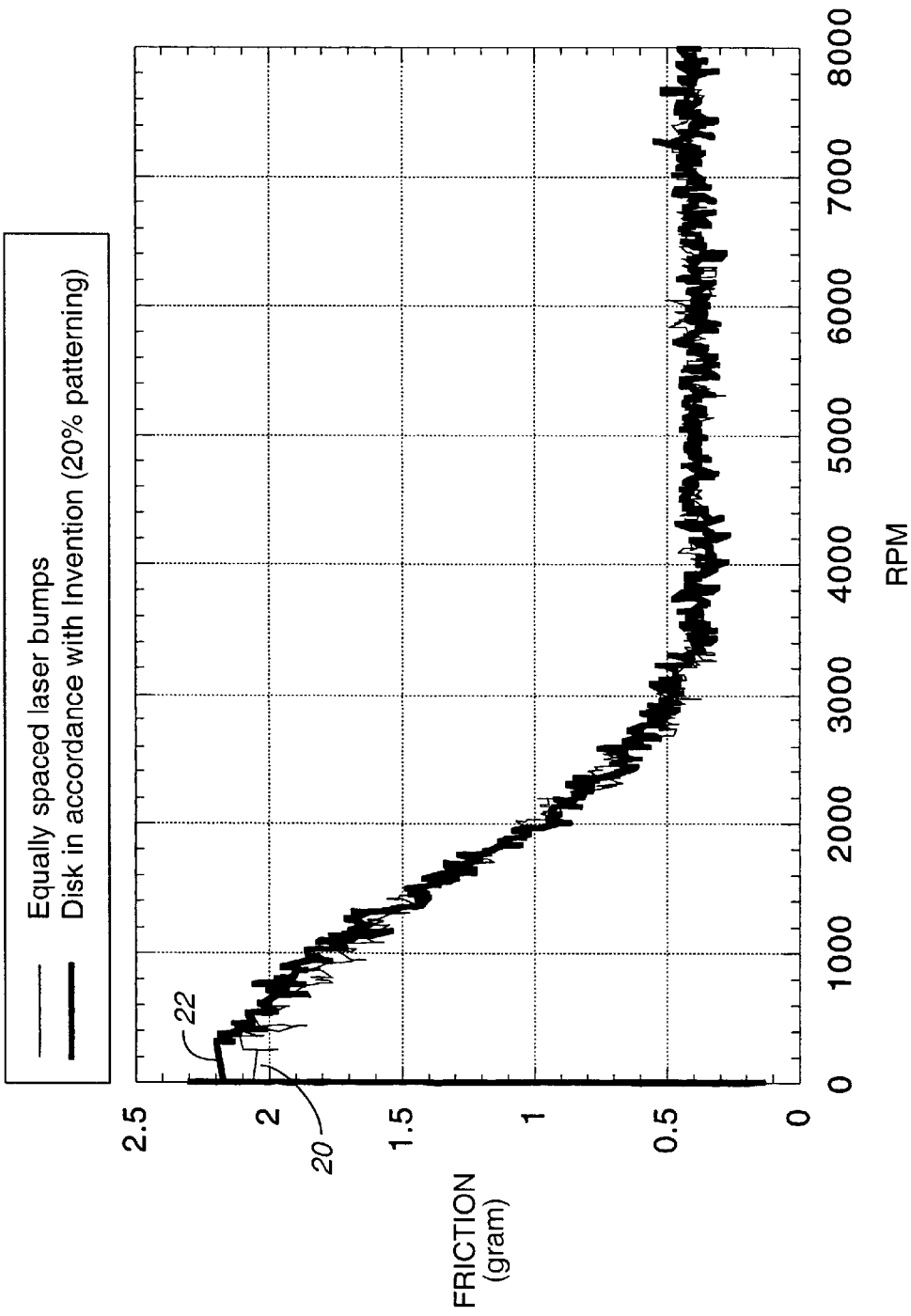
FIG._4

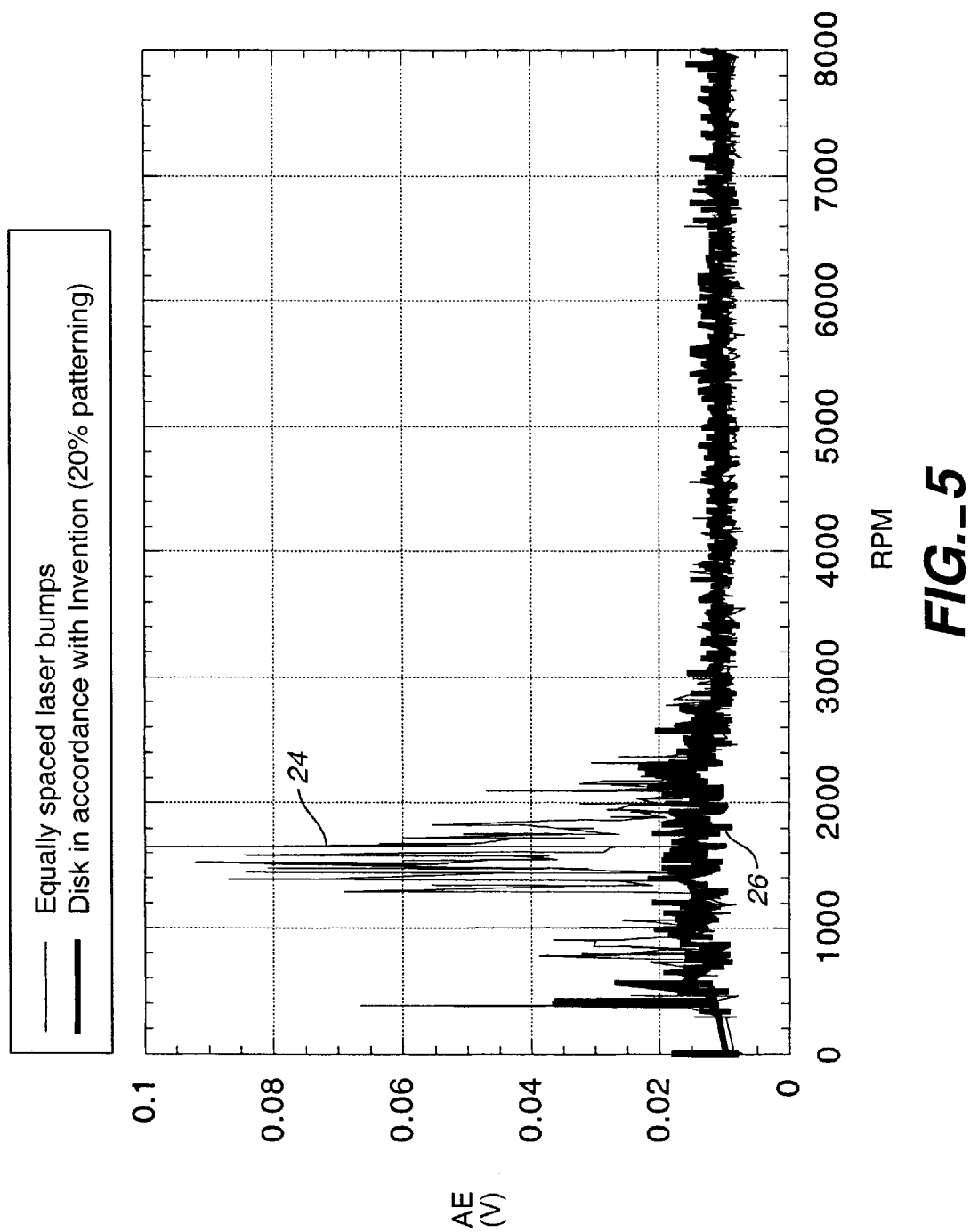
FIG._5

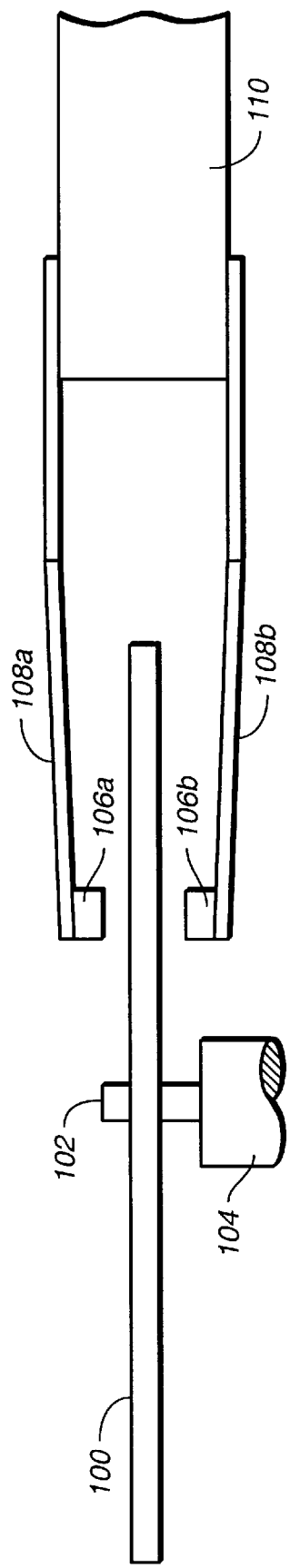
FIG._6

PATTERNED LASER ZONE TEXTURE

BACKGROUND OF THE INVENTION

This invention relates to methods for laser texturing magnetic disks and the resulting disks.

It is known in the art to manufacture magnetic disks using the following method.

1. First, a NiP alloy layer is electroless plated onto an Al alloy substrate. This NiP alloy is hard, and prevents the disk from being dented if it subsequently strikes a read-write head during use.
2. The NiP alloy layer is then polished.
3. The NiP alloy layer is then laser textured at a region of the disk known as the contact-start-stop, or CSS, zone. This zone is where a read-write head rests when the disk is not in use. Of importance, laser texturing reduces static friction ("stiction") and dynamic friction between the magnetic disk and the read-write head when the disk drive is turned on or off. Reducing stiction and friction is important for increasing the useful life of the magnetic disk.
4. An underlayer (e.g. Cr or NiP), a magnetic Co alloy, and a protective overcoat (e.g. zirconia or hydrogenated carbon) are then sputtered, in that order, onto the laser textured NiP layer.
5. A lubricant is then applied to the protective overcoat. After fabrication, the disk is incorporated into a hard disk drive.

The laser texture is applied to the disk by applying laser pulses to the Nip alloy layer while the substrate is spinning. The laser pulses result in the formation of laser bumps, which can be either "ridge-shaped" or "sombrero-shaped," depending on various factors such as the laser pulse parameters. (Ridge and sombrero-shaped bumps are discussed, for example, In U.S. Pat. No. 5,741,560, issued to Ross, incorporated herein by reference.)

The bumps are typically arranged in a spiral pattern on the CSS zone of the disk surface. When the disk drive is off, the read-write head rests on the laser bumps in the CSS zone. When the disk drive is first turned on, the read-write head drags across the surface of the CSS zone until the disk is spinning fast enough to create an air bearing for the head to "fly" on. The laser bumps reduce static and dynamic friction between the read-write head and the disk during this process. When the disk drive is turned off, the read-write head is positioned over the CSS zone, and the disk rotation decelerates until the read-write head comes into contact with the CSS zone. Eventually, the read-write head comes to rest on the CSS zone when the disk stops spinning.

Regardless of which shape laser texture bumps are used, if the bumps are spaced at a constant distance, the bumps may cause the read-write head to vibrate when the head takes off and lands. If the read-write head is caused to vibrate at a natural resonant frequency of the read-write head mechanism, these vibrations may be exacerbated. There are several parts of the read-write mechanism that have their own natural resonant frequency. For example, the air bearing itself may have a natural resonant frequency at about 100 KHz. The slider body for a glide head having a 50% form factor (e.g. a slider having a piezoelectric transducer coupled thereto that is part of test apparatus) may resonate at about 250 KHz. A slider body for a read-write head having a 50% form factor may have a natural resonant frequency at 750 KHz. (The term "50% form factor refers to the slider size, i.e. 2 mm long by 1.6 mm wide by 0.433 mm high.)

The read-write head mechanically interacts with the bumps while the disk rotation is accelerating or decelerating. Therefore, at certain times the disk will be spinning at a velocity such that if the bumps are regularly spaced, they provide mechanical excitation to the read-write head at a frequency close to one of the natural resonant frequencies of the read-write head mechanism. While there is debate about the specific effects that read-write head vibration has on a disk drive, generally there is agreement that reducing or eliminating these vibrations is desirable. See, for example, Yao et al., "Head-Disc Dynamics of Low Resonance Laser Textures—A Spectrogram Analysis", IEEE Trans. On Magnetics, Vol. 34, No. 4, July 1998, page 1699–1701.

Since the laser bumps can cause vibrations in the read-write head, it has been suggested that the vibrational excitation of the read-write head can be reduced by altering the position and spacing of the laser bumps. One technique for varying the position and spacing of the laser bumps in the plated NiP alloy layer is to vary the laser pulse frequency. In particular, by randomly varying the laser frequency, one could vary the bump spacing. Unfortunately, without using special techniques, this would compromise the stability of the energy per pulse of the laser. Such stability is critical to making consistent laser bumps of a controlled height.

Another technique for varying the position of the laser bumps would be to block selected laser pulses with a solid-state shutter. This would produce again a spiral zone pattern, but with variable length "gaps" where bumps would be missing. Unfortunately, these gaps in the texture pattern would be multiples of one fundamental spacing distance based on the laser pulse frequency. This means that the pattern would still be capable of exciting vibration in the read-write head at the natural resonant frequency of the read-write head mechanism.

SUMMARY

A method for laser texturing a substrate in accordance with our invention comprises the step of rotating a substrate, varying the rotational velocity of the substrate, and applying laser pulses to at least a portion of the substrate while the substrate is being rotated. In one embodiment, the rotational velocity of the substrate is varied in accordance with a substantially periodic function. In one embodiment, the rotational velocity of the substrate is varied sinusoidally or in accordance with a sawtooth function. After texturing, a magnetic layer is deposited on the substrate to form a magnetic disk. (Typically, other layers, such as an underlayer and a protective overcoat are also deposited on the substrate. The underlayer is formed between the substrate and the magnetic layer, and the protective overcoat is formed over the magnetic layer.)

We have discovered that by varying the position of the laser bumps in this manner, we can sharply reduce the vibrational energy imparted to a read-write head by the laser bumps when the read-write head takes off from or lands on a magnetic disk.

In one embodiment, during laser texturing, the substrate spins at a mean velocity of 3200 RPM. The velocity of the substrate is varied by 300 RPM about this mean velocity. In other words, the rotational velocity varies between 2900 and 3500 RPM. During this process, laser pulses of a constant frequency are applied to the substrate, thereby forming a laser bump pattern in which the spacing of the laser bumps varies periodically. In one embodiment, the laser bumps are arranged in a spiral. In another embodiment, the laser bumps are arranged in concentric circles.

In accordance with another aspect of our invention, a magnetic disk comprises a pattern of texture bumps in which the spacing of the bumps is periodically varied in the circumferential direction. This pattern of laser bumps is neither random, nor are the bumps regularly spaced.

BRIEF DESCRIPTION OF THE DRAWINGS

FIG. 1 illustrates a substrate being rotated while texture bumps are applied thereto with a laser.

FIG. 2 illustrates the spacing between laser bumps formed on a substrate in accordance with our invention in which the spacing was varied by about 10%.

FIG. 3 illustrates laser bumps formed on the substrate of FIG. 2 during texturing.

FIG. 4 shows the relation between friction and rotational velocity for a disk having regularly spaced laser bumps and a disk having laser bumps spaced in a pattern in accordance with our invention.

FIG. 5 illustrates the relation between an AE signal and rotational velocity for a disk having regularly spaced laser bumps and a disk having laser bumps spaced in a pattern in accordance with our invention.

FIG. 6 schematically illustrates a disk drive comprising a disk having a patterned zone texture in accordance with the invention.

DETAILED DESCRIPTION

Referring to FIG. 1, a substrate 10 is mounted on a spindle 12 which is rotated by a motor 13 while lasers 14a and 14b apply laser pulses at a constant frequency to sides 15a and 15b of substrate 10, respectively. While substrate 10 is spinning, lasers 14a, 14b are moved slowly in the radial direction R of substrate 10 so laser bumps will be formed in a spiral pattern in response to the laser pulses. However, in other embodiments, the laser bumps are formed in a pattern of concentric circles instead of a spiral.

In one embodiment, substrate 10 comprises an Al alloy 16 covered on both sides with electroless plated NiP 18a, 18b. However, substrate 10 can comprise other materials as well. After texturing, an underlayer (e.g. Cr or NiP), a magnetic Co alloy, and a protective overcoat (e.g. hydrogenated carbon or zirconia) are subsequently sputtered, in that order, onto both sides of substrate 10, and a lubricant layer is applied to the protective overcoat. In this way, a magnetic disk is formed.

In one embodiment, lasers 14 are device model No. V80–106Q, which is a diode-pumped Q-switched Nd-VO$_4$ laser manufactured by SpectraPhysics of Mountain View, Calif. Lasers 14 can produce pulses having an 80 ns duration, a 110 KHz frequency and an energy of 20 µJ/pulse. However, other pulse durations, frequencies, and energies can also be used. In addition, other types of lasers such as continuous wave (cw) and $CO_2$ lasers can be used.

Motor 13 and spindle 12 can be of a type manufactured by Air Bearing Technology of Hayward, Calif. The controller for motor 13 can be of a type made by Compumotor of Rohnert Park, Calif.

Substrate 10 typically has a diameter of about of 65 mm, 95 mm or 130 mm. (These are standard substrate sizes currently used in industry, but other substrate sizes can also be used.) Lasers 14 provide laser bumps in a band-shaped region of the substrate surface extending from a radius of about 16.5 to 20.5 mm from the center of substrate 10. This region is known as the CSS zone, and it is where a read-write head rests against the disk when the disk is not being used and is not spinning.

In one embodiment, during texturing, substrate 10 spins at a periodically varying rotational velocity. In one embodiment, substrate 10 spins at 3200 RPM, plus or minus about 10% (e.g. plus or minus about 300 RPM). If the substrate is spinning at 3200 RPM plus or minus 10%, and the laser pulse rate is 110 KHz, the resulting laser bump spacing is about 50 µm plus or minus about 10% (i.e. plus or minus about 5 µm). In order to minimize the mechanical stress on spindle 12 and disk 10 during acceleration and deceleration, the rotational acceleration and deceleration is typically kept below about 3000 RPM$^2$. The resulting laser bumps are spaced between about 45.5 to 57 µm in a spiral pattern. The distance between one track or row of bumps and the next row of bumps is about 50 µm.

FIG. 2 illustrates the variation in laser bump spacing versus distance along a spiral of bumps on a substrate in accordance with one embodiment of our invention. As can be seen, the distance varies periodically with a period of about 5 revolutions. As mentioned above, the spacing in the radial direction between adjacent rows of the spiral of bumps on the substrate is about 50 µm. A 10% bump spacing variation takes up about 100 to 125 µm of radial distance. (In other words, bumps that are at their minimum spacing or maximum spacing are located about 100 to 125 µm in the radial direction from a row of bumps at their average spacing.) Bumps that are at their minimum spacing in the circumferential direction are displaced by about 200 to 250 µm in the radial direction from a row of bumps that are at their maximum spacing. Since a typical read-write head rail is about 200 µm wide, this was acceptable. In other words, the period of laser bump spacing variation in the radial direction is on the order of the width of a read-write head rail. Given the width of a read-write head rail and the periodicity of the spacing variation, there are always a sufficient number of laser bumps under the read-write head to ensure sufficiently low friction and stiction between the read-write head and the disk.

FIG. 3 is a photograph of laser texture bumps formed during the texturing process of FIG. 2. As can be seen, the texture bumps are arranged into a set of rows. Each row is spaced about 50 µm from the adjacent lines in the radial direction (arrow R). The spacing of the texture bumps in the circumferential direction (arrow C) varies in accordance with FIG. 2.

Laser bumps are placed on magnetic disks to reduce friction and stiction between the disk and a read-write head during use. FIG. 4 illustrates the relation between friction between a read-write head and a disk vs. rotational velocity of the disk. FIG. 4 illustrates friction for a disk having regularly spaced laser bumps (curve 20) and between a read-write head and a disk having a patterned zone texture in accordance with our invention (curve 22). As can be seen, there is no appreciable difference between the two disks insofar as friction is concerned.

As mentioned above, in the prior art it was recognized that regularly spaced laser texture bumps can cause vibrations in a read-write head during take-off and landing operations. Such vibrations are typically measured by coupling a piezoelectric transducer to a read-write head, and measuring the transducer output signal during take-off (as the disk begins to spin from a resting position). The piezoelectric transducer provides an electrical signal known as an acoustic emission ("AE") signal. We have discovered that our patterned laser zone texture provides a reduced AE signal (and therefore reduced vibration) compared to a prior art disk having regularly spaced laser bumps. This can be readily seen in FIG. 5, which shows the output signal (in volts) from a piezoelectric transducer coupled to a read-write head used in conjunction with a disk having laser bumps evenly spaced in accordance with the prior art (curve 24) vs. rotational velocity of the disk. FIG. 5 also shows the output signal from a read-write head used in conjunction with a magnetic disk having laser bumps spaced in a pattern in accordance with our invention (curve 26). As can be seen, there is a large reduction in the AE signal (about a 1 volt maximum for curve 24 vs. about a 0.28 volt maximum for curve 26).

As mentioned above, our periodically varying patterned laser zone texture has advantages over techniques such as randomizing the timing of the laser pulses. Our invention also has advantages over other methods of randomizing laser bumps. For example, one might be tempted to try to randomly vary the rotational speed of the substrate during texturing. However, if one were to attempt to do this, one would have to account for the inertia of the substrate and spindle when trying to accelerate or decelerate the substrate. (Because of the mass of the substrate and spindle, one could not instantaneously vary the rotational velocity of the substrate. One would also have to worry about overshooting a desired rotational velocity.) In addition, one would have to ensure that there were always enough laser bumps on all portions of the CSS zone to ensure that friction and stiction between the head and disk was low enough. By using our patterned zone texture, we ensure that there are always a sufficient number of texture bumps in the CSS zone.

A disk textured in accordance with our invention is typically incorporated into a disk drive. Such a disk drive typically comprises a magnetic disk 100 (FIG. 6) mounted on a spindle 102 which is rotated by a motor 104. A pair of read-write heads 106a, 106b fly over disk 100, and read data from and write data to the magnetic layer within disk 100. Read-write heads 106a, 106b are held in proximity to disk 100 by arms 108a, 108b, respectively. Arms 108a, 108b are coupled to an actuator which controls the position of heads 106a, 106b relative to disk 100. As mentioned above, the texture bumps on disk 100 minimize static and dynamic friction between heads 106a, 106b and disk 100 during take-off and landing. However, the positioning of the bumps reduces vibrations imparted to heads 106a, 106b.

While the invention has been described with respect to specific embodiments, those skilled in the art will appreciate that changes can be made with regard to details without departing to the spirit and scope of our invention. For example, different types of lasers can be used in accordance with our invention, as can different types of substrates made of various materials. Different types of underlayers, magnetic alloys, protective overcoats and lubricants can be used, deposited by various techniques. In one embodiment, only a portion of the substrate surface is textured. In other embodiments, the entire substrate surface is textured. Different layers within the magnetic disk can be laser textured.

While a disk or substrate can be textured in accordance with our invention by varying the rotational velocity of the substrate during texturing, in other embodiments, one can keep the rotational velocity of the substrate constant and vary the frequency of the laser used to texture the substrate. Although this might create laser stability issues, or require maintaining of a constant energy per laser pulse, a laser bump pattern in accordance with our invention can be provided in this way. Accordingly, all such changes come within the present invention.

We claim:

1. Method comprising:
   rotating a substrate;
   applying laser pulses to the substrate to form laser texture bumps on at least a portion of said substrate such that the spacing of said laser texture bumps in the circumferential direction of said substrate varies in a substantially periodic manner.

2. Method of claim 1 wherein the frequency of said laser pulses is varied so that the laser texture bump spacing in the circumferential direction varies in said substantially periodic manner.

3. Method of claim 1 further comprising:
   accelerating and decelerating the rotational velocity of said substrate in accordance with a substantially periodic function while performing said step of applying said laser pulses to form a pattern of said laser bumps.

4. Method of claim 3 wherein said substantially periodic acceleration and deceleration of said rotational velocity results in laser bumps such that the distance between the position of said laser bumps varies substantially periodically.

5. Method of claim 3 wherein the rotational velocity of said substrate is varied by more than 0% but less than 50%.

6. Method of claim 3 wherein the rotational velocity of said substrate is varied by more than 0% but less than 20%.

7. Method of claim 1 wherein said spacing of said laser texture bumps in the circumferential direction of said substrate varies in a periodic manner.

8. Method of claim 1 wherein the variation in the spacing of said laser texture bumps is greater than 0%.

9. Method of claim 3 further comprising the step of depositing an underlayer, a magnetic alloy layer, and a protective overcoat on said substrate.

10. Method of claim 1 wherein said substrate is used to manufacture a magnetic disk, and the variation in spacing of said laser texture bumps is sufficient to reduce the vibration imparted to a head used in conjunction with said disk.

11. Method of claim 3 wherein the substrate rotational velocity is varied substantially sinusoidally.

12. Method of claim 3 wherein the substrate rotational velocity is varied substantially in accordance with a sawtooth function.

13. Method of claim 1 wherein said spacing varies in a periodic manner.

14. Method comprising:
    rotating a substrate;
    applying laser pulses to the substrate to form laser texture bumps on at least a portion of said substrate such that the spacing of said laser texture bumps in the circumferential direction of said substrate varies in a substantially periodic manner, said method further comprising accelerating and decelerating the rotational velocity of said substrate in accordance with a substantially periodic function while performing said step of applying said laser pulses to form a pattern of said laser bumps, wherein the rotational velocity of said substrate is varied by at least about 2%.

15. Method comprising:
    rotating a substrate;
    applying laser pulses to the substrate to form laser texture bumps on at least a portion of said substrate such that the spacing of said laser texture bumps in the circumferential direction of said substrate varies in a substantially periodic manner, said method further comprising accelerating and decelerating the rotational velocity of said substrate in accordance with a substantially periodic function while performing said step of applying said laser pulses to form a pattern of said laser bumps, wherein the rotational velocity of said substrate is varied by at least about 5%.

16. A method for texturing a magnetic disk comprising applying laser pulses to at least a portion of a disk-shaped substrate to form laser texture bumps on said substrate, the distance between said laser texture bumps varying in the circumferential direction, said varying being in a non-random manner.

17. Method of claim 16 wherein the variation in the distance between laser texture bumps is greater than 0%.

18. Method of claim 16 wherein the variation in the distance between laser texture bumps is sufficient to reduce the vibration imparted by said disk to a head used in conjunction with said disk.

19. A method for manufacturing a magnetic disk, said magnetic disk comprising a disk shaped member including a magnetic layer, said method comprising texturing at least a portion of said magnetic disk by applying laser pulses during said manufacturing to form texture bumps on the disk, the position of said texture bumps varying in the circumferential direction of said disk in a substantially periodic manner.

20. A method for manufacturing a magnetic disk, said magnetic disk comprising a disk shaped member including a magnetic layer, said method comprising texturing at least a portion of said magnetic disk by applying laser pulses during said manufacturing to form texture bumps on the disk, the position of said texture bumps varying in the circumferential direction of said disk in a non-random manner.

* * * * *